(12) United States Patent
Callway et al.

(10) Patent No.: US 6,753,881 B1
(45) Date of Patent: Jun. 22, 2004

(54) ADAPTER AND METHOD TO CONNECT A COMPONENT VIDEO INPUT TELEVISION TO A VIDEO PROVIDING UNIT

(75) Inventors: Edward G. Callway, Toronto (CA); Glen David, Toronto (CA)

(73) Assignee: ATI International SRL, Christchurch (BB)

( * ) Notice: Subject to any disclaimer, the term of this patent is extended or adjusted under 35 U.S.C. 154(b) by 206 days.

(21) Appl. No.: 09/703,784

(22) Filed: Nov. 1, 2000

(51) Int. Cl.⁷ .................................................. G09S 5/02
(52) U.S. Cl. ...................... 345/699; 345/428; 345/698
(58) Field of Search ................................ 345/699, 698, 345/3.1, 10, 11, 204, 428; 348/552, 584; 710/306, 62, 72; 439/620, 955

(56) References Cited

U.S. PATENT DOCUMENTS

| | | | | |
|---|---|---|---|---|
| 4,588,187 A | * | 5/1986 | Dell ........................ | 24/581.11 |
| 4,972,470 A | * | 11/1990 | Farago ....................... | 713/192 |
| 5,159,683 A | * | 10/1992 | Lvovsky et al. ............... | 710/9 |
| 5,276,458 A | * | 1/1994 | Sawdon ....................... | 345/698 |
| 5,561,764 A | * | 10/1996 | Ninomiya .................... | 714/37 |
| 5,563,665 A | * | 10/1996 | Chang ........................ | 348/552 |
| 5,602,567 A | * | 2/1997 | Kanno ........................ | 345/698 |
| 5,680,555 A | * | 10/1997 | Bodo et al. .................. | 710/306 |
| 5,691,741 A | * | 11/1997 | Kerigan et al. ............. | 345/698 |
| 5,694,213 A | * | 12/1997 | Gable ........................ | 345/699 |
| 5,727,191 A | * | 3/1998 | Konishi et al. ............. | 345/698 |
| 5,742,273 A | * | 4/1998 | Flinders et al. ............. | 345/698 |
| 5,815,208 A | * | 9/1998 | Samela et al. ............. | 348/446 |
| 5,910,806 A | * | 6/1999 | Narui et al. ................ | 345/536 |
| 6,094,690 A | * | 7/2000 | Lee ........................... | 710/10 |
| 6,100,936 A | * | 8/2000 | Jordan et al. ............... | 348/552 |
| 6,131,125 A | * | 10/2000 | Rostoker et al. ............ | 709/250 |
| 6,243,654 B1 | * | 6/2001 | Johnson et al. .............. | 702/85 |
| 6,307,538 B1 | * | 10/2001 | Bacon ........................ | 345/163 |

* cited by examiner

*Primary Examiner*—Steven Saras
*Assistant Examiner*—Fritz Alphonse
(74) *Attorney, Agent, or Firm*—Vedder, Price, Kaufman & Kammholz, P.C.

(57) ABSTRACT

An adapter (e.g., connector, dongle) is used to connect a component video television, such as an SDTV or HDTV, to a video providing unit, such as a computer or any other suitable video providing unit, that includes a plurality of video input pins, a plurality of video output pins, a plurality of control pins and a circuit. The circuit is operative to identify to a video providing unit through the control pins, that the component video input television is not of a display type that the video providing unit expects.

10 Claims, 5 Drawing Sheets

ADAPTER AND METHOD TO CONNECT A COMPONENT VIDEO INPUT TELEVISION TO A VIDEO PROVIDING UNIT

FIELD OF THE INVENTION

The invention relates generally to connectors or adapters, and more particularly to connectors or adapters used to provide video signals from one unit to another unit.

BACKGROUND OF THE INVENTION

Video signal providing devices, such as graphics accelerators, desktop computers, laptop computers and any other suitable devices may provide video signals that may be output to differing types of monitors or display devices. For example, a personal computer or laptop device may be able to drive a VGA monitor having different resolutions and refresh rates and other types of monitors. Differing monitor manufacturers have differing resolutions and accordingly, graphics accelerators and other video signal providers attempt to provide the proper video signaling to the monitor depending upon the monitor type.

To allow a video signal provider to configure for a number of different monitor types, an industry standard has been adopted to provide a display data channel (DDC) which is a two wire interface that uses $I^2C$ protocol to identify monitors. For example, a graphics processor through the DDC wires will send a display configuration request to a monitor using $I^2C$ protocol to find out the proper configuration necessary for that monitor, immediately upon boot up of the video signal provider. As a result, a user is presented with a proper display upon power up of a personal computer, for example. Typically, conventional video signal providers default to a VGA type monitor and provide 680 by 480p resolution. Moreover, the output may be in RGB format whereas for high definition televisions and other component video input televisions, such as SDTVs, such devices typically require a component video signal format such as Y, Pr, Pb format. Computer monitors are equipped with a microprocessor or other suitable interface circuit to respond to a display monitor identification request via the DDC wires.

A problem arises with component video input televisions such as HDTVs and SDTVs that do not have a monitor identification system, such as a DDC wiring scheme. Conventional VGA outputs are not suitable for component video input televisions. VGA may be considered a non-component video input television display mode. Accordingly, the conventional video signal providers that can connect to differing types of monitors usually have a default display mode of a non-component video input television type. Accordingly, when a conventional video signal provider is connected to an HDTV through a PC, the video signal provider defaults to an RGB 640 by 480p or other mode and not to the required Y, Pr, Pb 480I, 480p, 720p 1080I or 1080p standard recognized by an SDTV or HDTV. Accordingly, the image display upon power up can be unsuitable It is also known that an SDTV or HDTV may provide a graphic user interface to allow a user to select differing display resolutions. It is also known in wide screen signaling standards, such as the European standard, to require a user to enter a TV model via a graphic user interface. The model type then indicates which type of control information is sent to the TV to alter the television aspect ratio or scan rate if the television is a wide screen, for example. However, such systems typically require a user to enter TV model information and also do not typically interface with video signal providers that provide video signals for differing formats of video signals. Moreover, SDTV's or HDTVs may support multiple scan rates and do not typically communicate this information over a communication link automatically. Accordingly, with video signal providers that attempt to connect to HDTVs, such video signal providers do not know what TV monitor type that is being connected and do not know the TV monitor capabilities so that the display upon power up is unsuitable. Upon booting up, a conventional laptop computer, graphics accelerator, or any other suitable video signal providing device automatically assumes that the monitor is a VGA type. However, many SDTVs and HDTVs do not support the RGB color space format. Accordingly, the non-component video input television display mode being used outputs, for example, horizontal synchronization pulses and vertical synchronization pulses on pins that are not connectable to the HDTV or SDTV.

In addition, it is known to have VGA to SDTV or HDTV connector boxes that perform (at least one of) color space conversions and timing to convert video signals from VGA (RGB) color space to SDTV or HDTV (Y, Pb, Pr) color space. However, such converter boxes typically duplicate the functions of graphics accelerators and other video signaling providers that perform the color space conversion outside of the converter boxes and can be quite costly.

Accordingly, a need exists for an adapter and method to facilitate an interconnect between a video providing unit having a non-component video input television default display mode, and a component video input television.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

An adapter (e.g., connector, dongle) is used to connect a component video television, such as an SDTV or HDTV, to a video providing unit, such as a computer or any other suitable video providing unit, that includes a plurality of video input pins, a plurality of video output pins, a plurality of control pins and a circuit. The circuit is operative to identify to a video providing unit through the control pins, that the component video input television is not of a display type that the video providing unit expects.

In one embodiment, the adapter may be a connector with a built in ROM, CPU or any other suitable circuitry that may be read through a video BIOS or driver or using any suitable program or device such that the connector indicates a non-VGA (or non-DVI) monitor is connected to the video signal provider. In one embodiment, a video BIOS or driver looks on the DDC lines to see if the adapter is present. In this embodiment, the circuit may be a read only memory (ROM) which contains settings to inform the video signal provider to default to an SDTV or HDTV mode and provide the requisite video signal format. For example, the ROM may be an electrically erasable PROM (EEPROM) which indicates, for example, that the connector is made by a specific manufacturer and its presence indicates that an SDTV or HDTV is being connected to VGA signaling pins.

In an alternative embodiment, the circuit may include a microcomputer, CPU, DSP or any other suitable processing device that communicates with the component video input television to obtain display configuration data, such as from an SDTV or HDTV, database or other source, upon boot up by the video signal provider and provides the display configuration data to the video providing unit so that the video providing unit can suitably output the appropriate video signal format.

In another embodiment, the adapter may include a selectable switching array, such as a DIP switch or any other suitable switch that includes a plurality of switches that are appropriately switched to a selectable position depending upon a type of component video input monitor being connected to the plurality of output pins of the adapter. For example, the DIP switch may have switches positioned to indicate that the display device is a component video input television manufactured by a specific manufacturer and therefore requires a specific resolution. The switch positions are provided to the video signal provider by display ID detection signaling via one or more adapter pins.

Where a ROM or programmable memory is used, the programmable memory may contain prestored display configuration data associated with an HDTV or other component video input television so that the video signal provider is then informed of the requisite configuration parameters by the adapter without requiring the adapter to communicate with the component video input television.

Figure 1:
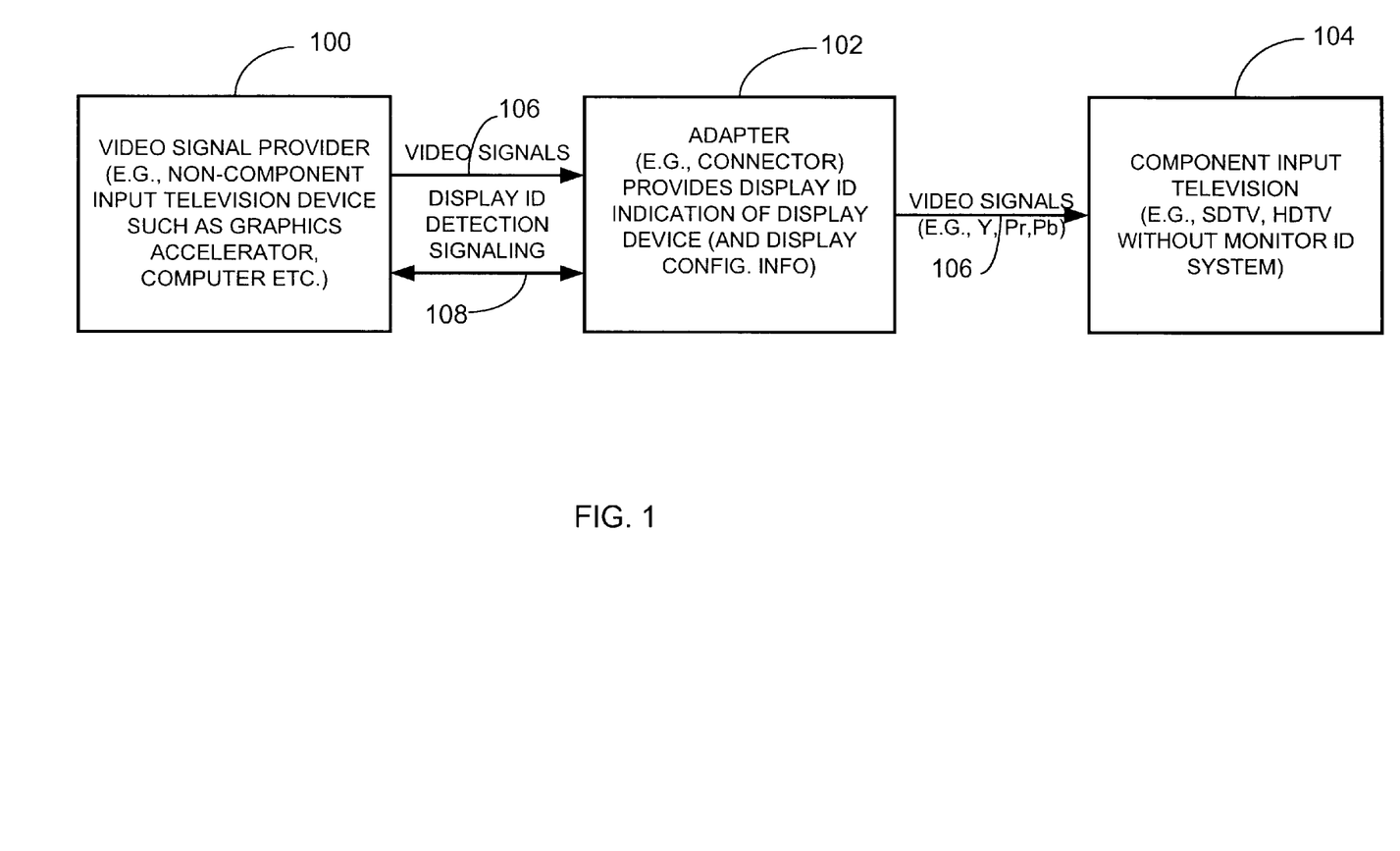
FIG. 1 is a block diagram illustrating an adapter interposed between a video signal provider and a component video input television that does not include a monitor ID system, in accordance with one embodiment of the invention.

FIG. 1 illustrates a video signal provider 100 for a non-component video input television device such as a graphics accelerator chip, computer or any other suitable device that outputs video signals, an adapter 102 and a component video input television 104. The component video input television 104 may be, for example, a high definition television, SDTV, or any other suitable component video input television that does not have a monitor identification system such as DDC or an equivalent. The video signal provider 100 outputs video signals 106 to the adapter 102 which then passes video signals 106 to the component video input television 104. The video signal provider 100 and adapter 102 communicate component video input television configuration information via display identification detection signaling 108. The adapter 102 is operative to connect the component video input television 104 and the video providing unit 100. The adapter 102 may be any suitable connector as described herein and provides display identification indication of the component video input television, or other display device and may also provide display configuration information for the video signal provider. Display identification indication may simply be one or more bits or analog signals indicating that the component video input television is present. Display configuration information may include, but is not limited to, the scan rate and resolution of the component video input television. The video signal provider includes a multi-format conversion circuit and sync signaling as known in the art and can provide RGB, Y, Pb, Pr or other suitable video signaling formats desired to allow the new signal provider to drive multiple and/or different monitors requiring different video formats.

Figure 2:
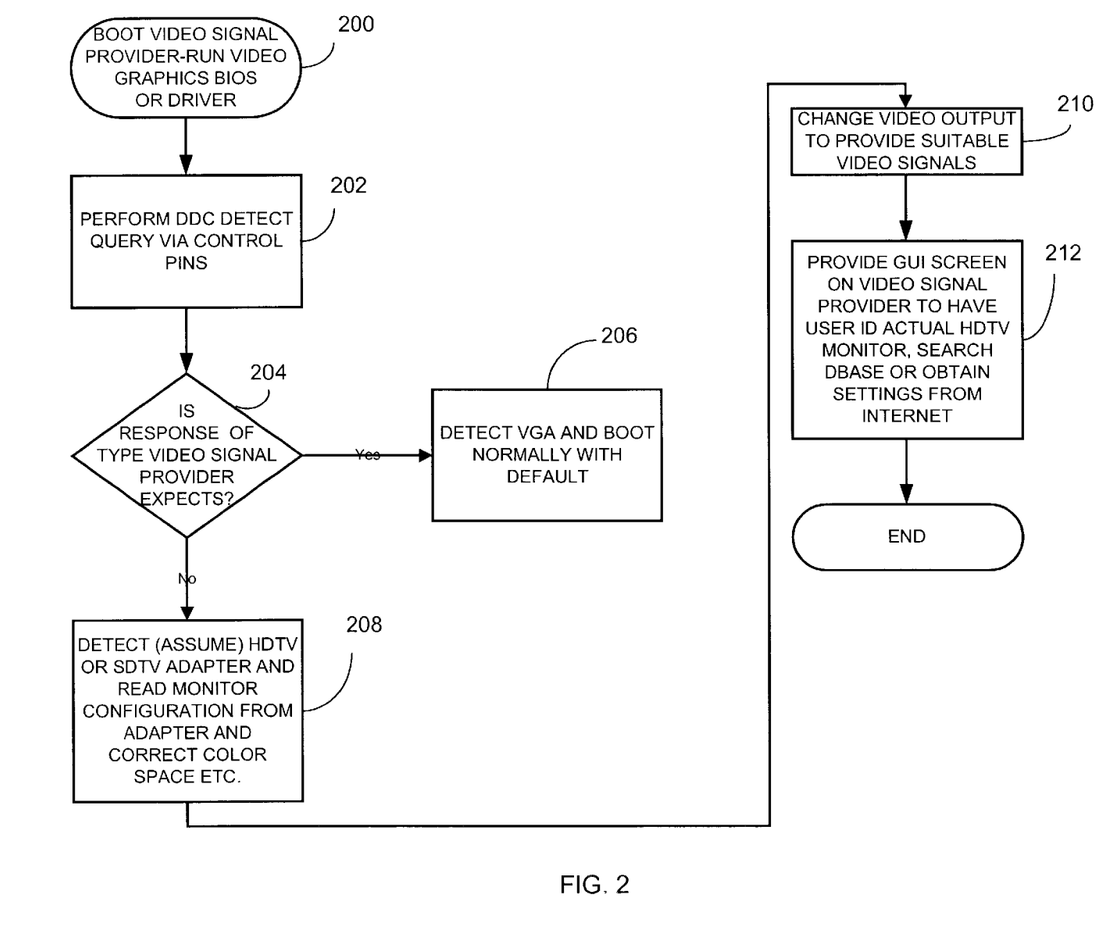
FIG. 2 is a flow chart of a method for communicating video signals to a display device that does not include a display identification system in accordance with one embodiment of the invention.
Figure 3:
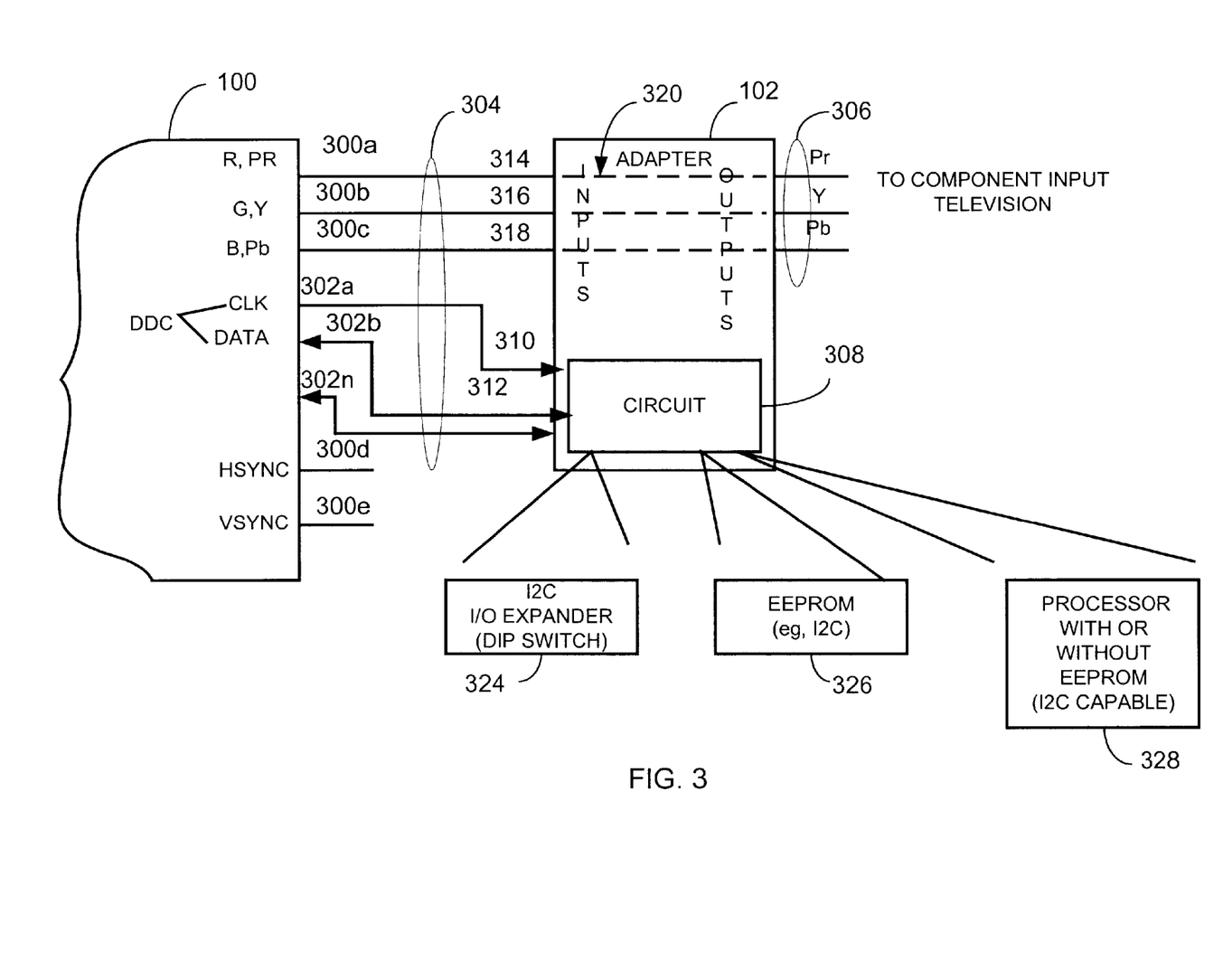
FIG. 3 is a diagram illustrating one example of an adapter in accordance with one embodiment of the invention.

Referring to FIGS. 1–3, video signal provider 100 includes a plurality of video signaling pins 300a, 300b, 300c, 300d and 300e (see FIG. 3) as well as display ID detection signaling pins 302a–302n. In one embodiment, the display ID detection signaling pins 302a and 302b may be a display data channel two wire interface. For purposes of illustration and not limitation, the invention will be described with reference to use of a display data channel interface that uses I²C protocol. The video signaling pins 300a–300c may output, for example, RGB formatted video signals and the pins 300d and 300e output the synchronization signaling if, for example, a VGA monitor is used. However, when a component video input television is used, the same pins 300a–300c may be used to output digital video signals with embedded synchronization information such a Pr, Y and Pb information as known in the art, such as that described in standards EIA 770.x and SMPTE 296M, 274M.

The adapter 102 includes a plurality of video input pins generally indicated as 304, a plurality of video output pins indicated as 306, and a plurality of control pins 305 that can be unidirectional or bi-directional. It will be recognized that any suitable number of video input pins, video output pins and control pins may be used. The adapter 102 also includes a circuit 308 that is operatively coupled to a plurality of control pins, in this example pins 310 and 312. The circuit 308 is operative to identify to the video providing unit 100 through the use of the control pins 310 and 312, that the component video input television 104 is not of the display type that the video providing unit 100 expects. For example, if the video providing unit 100 is a graphics accelerator that expects, for example, to default to a VGA mode, the circuit 108 indicates that the video providing unit 100 should not use a VGA default mode. As such, when booting up, the video providing unit 100 will not output VGA formatted information that is then passed on to the component video input television but instead may provide the suitable format required for the component video input television, without requiring a monitor ID system by the component video input television.

A plurality of video input pins, namely input pins 314, 316 and 318 are operatively connected to the plurality of video output pins 306 as shown by dashed lines 320. These pins may be hard wired or otherwise suitably multiplexed or connected via electronic switches, if desired. The video output pins 306 provide component video information between the video providing unit 100 and the component video input television 104. In this embodiment, the plurality of video input pins 314–318 are coupleable to receive component video signals from the video output pins 300a–300c. The control pins 310–312 can be used to communicate with the video providing unit 100. It will be recognized that as used herein, pins is a broad term meaning any surface that can provide electrical contact with another surface and is not limited to, for example, planar or cylindrical metal or metallized contacts and also includes sockets instead of protruding (male) contacts.

The circuit 308 on the adapter effectively allows the adapter to be a "smart" adapter, if desired. The circuit may take any suitable form including a very simple form of, for example, hard wired connections such that pins 302a and 302b are grounded so that upon connection of the adapter the video providing unit indicates to the video providing unit that the component video input television is not of a display type that the video providing unit expects. Also, the circuit 308 may take more sophisticated forms. For example, as shown, the circuit 308 may include a selectable switching array 324 such as a dual in-line package (DIP) switch that may serve as an I/O expander, or any selectable switching array 324 having a plurality of switches that are appropriately switched to a selectable position depending upon a type of component video input monitor being connected to the plurality of video output pins 306 of the adapter 102. For example, the selectable switching array 324 can use as an $I^2C$ I/O expander or a plurality of lines 302a–302n may be used. For example, the DIP switch may be set to an appropriate configuration to indicate a specific brand of SDTV or HDTV so that the video providing unit before completely booting up is aware of not only that the component video input television is being connected, but also the model type and/or capabilities of the monitor, such as scan rate and resolution. In this embodiment, the video providing unit may include the database or lookup table indicating the appropriate settings required based on the configuration of the DIP switch.

In an alternative embodiment, the circuit 308 may be a read only memory 326 containing data that indicates the component video input television 104 is not of a display type that the video providing unit expects. For example, the circuit 308 may be a EEPROM containing data indicating that the component video input television is of a specific manufacturer, scan rate, or resolution type or any other suitable information. The video providing unit may obtain this information via a DDC communication if the EEPROM is so programmed or through a plurality of other pins using any suitable communication protocol. In addition, the read only memory 326 will contain information that is readable through a $I^2C$ protocol preferably over lines 302a–302b to minimize the number of connection pins and to be compatible with existing video providing units. In this embodiment, the video providing unit via an updated Windows driver or any other BIOS or driver may provide a user configuration screen that is displayed on the component video input television so that a user through gui buttons or other interface, such as 324, may select the desired resolution and scan rate, if desired, after initial boot up. In addition, the programmable memory 326 may contain display configuration data that is associated with the monitor or display of the component video input television such that the EEPROM may have stored thereon resolution settings and scan rates for specific SDTV's or HDTVs indexed by manufacturer, model number, serial number or other suitable criteria. For example, different PROMs may be dedicated to differing manufacturers or differing HDTVs, a PROM may be programmed with ranges of SDTV's or HDTV's and a user may select the requisite SDTV or HDTV via a GUI or I2C expander, or a GUI can download to the EEPROM the necessary resolution information from a database accessible via the Internet.

It will be recognized that power for the circuit 308 may be supplied to the adapter through any suitable mechanism such as by battery, power plug, through the $I^2C$ pins or through a separate pin, or any other mechanism as desired. The use of a digital processing device is the circuit 308 may also save configuration results on board so the video providing unit need only read the configuration result through the DDC lines 302a and 302b to immediately know that an SDTV or HDTV is present. It is preferred, but not required, that the protocol used is $I^2C$ protocol to communicate information over the control pins, namely pins 302a and 302b and 310 and 312 to facilitate display data channel communication.

An example of the operation and use of the adapter will also be described with reference to FIG. 2. As shown in block 200, the method includes booting the video signal provider, such as a graphics accelerator board or any other video signal provider and running, for example, video graphics BIOS or other driver suitable to initiate the DDC communication over pins 302a and 302b. As shown in block 202, the method includes providing a DDC detection query via the control pins, namely pins 310 and 312 to communicate with circuit 308. The multi-pin adapter 102 that is interposed between the video signal provider 100 and the display device 104, receives the display identification request, such as the DDC-based $I^2C$ based detection query. The adapter 102 provides a response to the display identification request which may be a DC ground signal, a digital communication, analog signal or any suitable signal depending upon the sophistication of the circuit 308. The video providing unit determines if the response is of a type that it expects as shown in block 204. If it is, as shown in block 206, the video providing unit assumes it is a VGA monitor and boots normally with the configuration determined by the DDC information obtained from the monitor. However, as shown in block 208, if the video providing unit detects an unexpected monitor (e.g., an SDTV or HDTV adapter), the video providing unit then may obtain the monitor configuration from the adapter, for example if the adapter contains a read only memory or digital processing device and provides the correct color space and other requirements necessary for the component video input television. The video signals are then output to the adapter 102 and the adapter 102 then provides the suitable format of video signals to the display device 104 in response to the response provided by the adapter to the video providing unit 100. If the adapter 102 stores display configuration data it may provide the display configuration data associated with the component video input television to the video providing unit.

As shown in block 210, the video providing unit may change video output to provide suitable video signals to output the correct video signaling format and may also then provide a graphic user interface screen on the component video input television to have a user identify the actual SDTV or HDTV monitor type and desired resolution settings. This information may be passed back through the adapter via the DDC lines, or any other suitable lines. This shown in block 212. The video providing unit may search a database or obtain settings from the Internet corresponding to the manufacturer type or other configuration information entered by a user through the graphic user interface if this information is not already prestored on the adapter.

Figure 4:
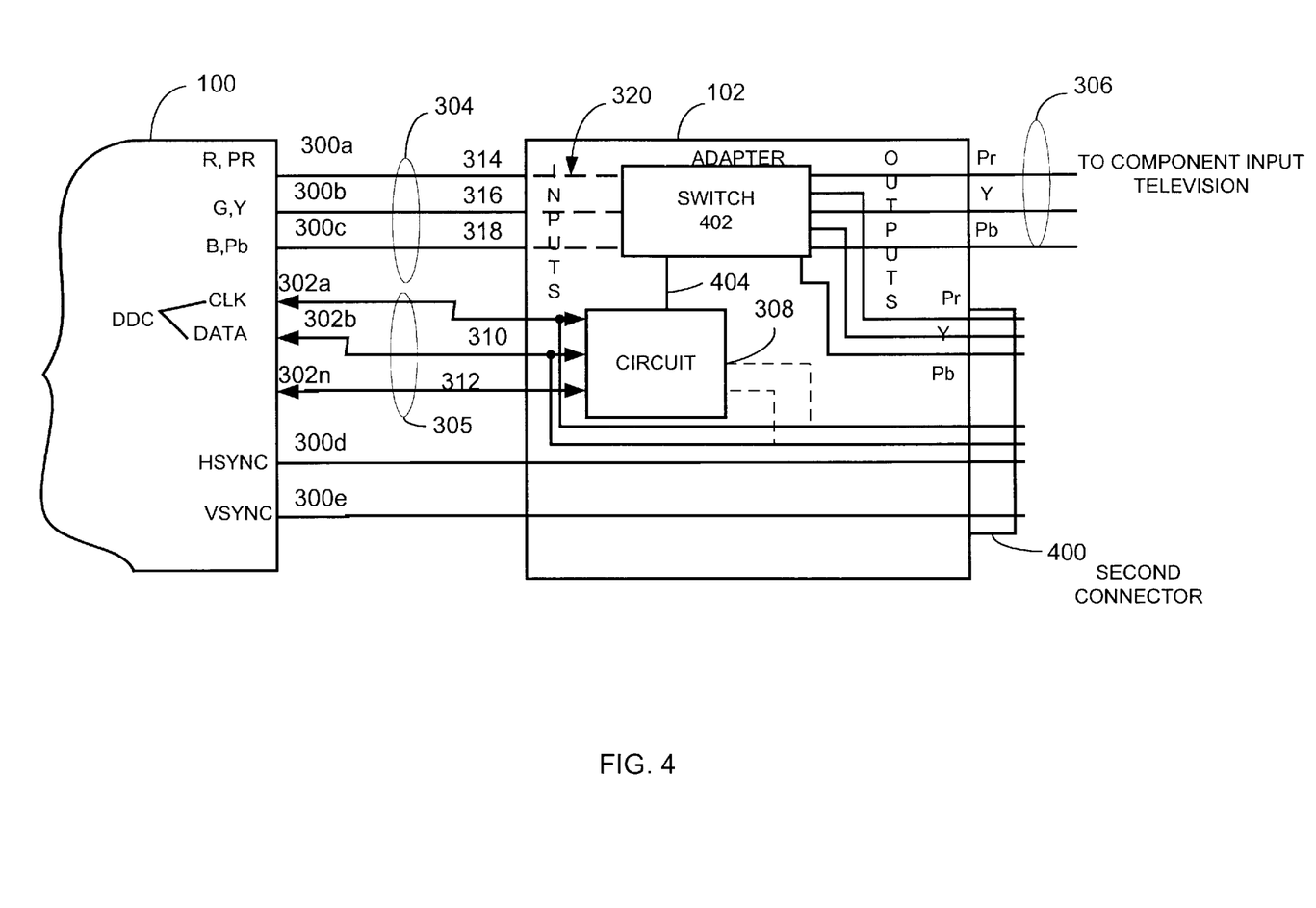
FIG. 4 is a diagram illustrating another example of an adapter in accordance with one embodiment of the invention.

FIG. 4 illustrates an alternative embodiment of the adapter wherein a second connector 400, such as 15 pin VGA connector or DVI-I connector is also provided. A switch 402 is interposed between input pins 304 such as pins 314–318 and video output pins 306. The switch 402 is controlled by the circuit 308 via control signal 404 (or bus) to pass the input pin signals 304 (RGB) to the second connector 400. In this embodiment, the other VGA signals such as HSYNC 300d, VSYNC 300e and DDC signals 302a and 302b are passed through to the second connector to form a DVI-I connector or 15 pin VGA connector.

The dashed lines indicate an alternative embodiment such that control signals are not routed directly to the second connector. Instead, when the switch 402 is selected to output video information 306, then the DDC lines 310 and 312 are disconnected from second connector 400. When switch 402 is set to connect the input 314–318 then control lines 310 and 312 are connected to the second connector 400.

Figure 5:
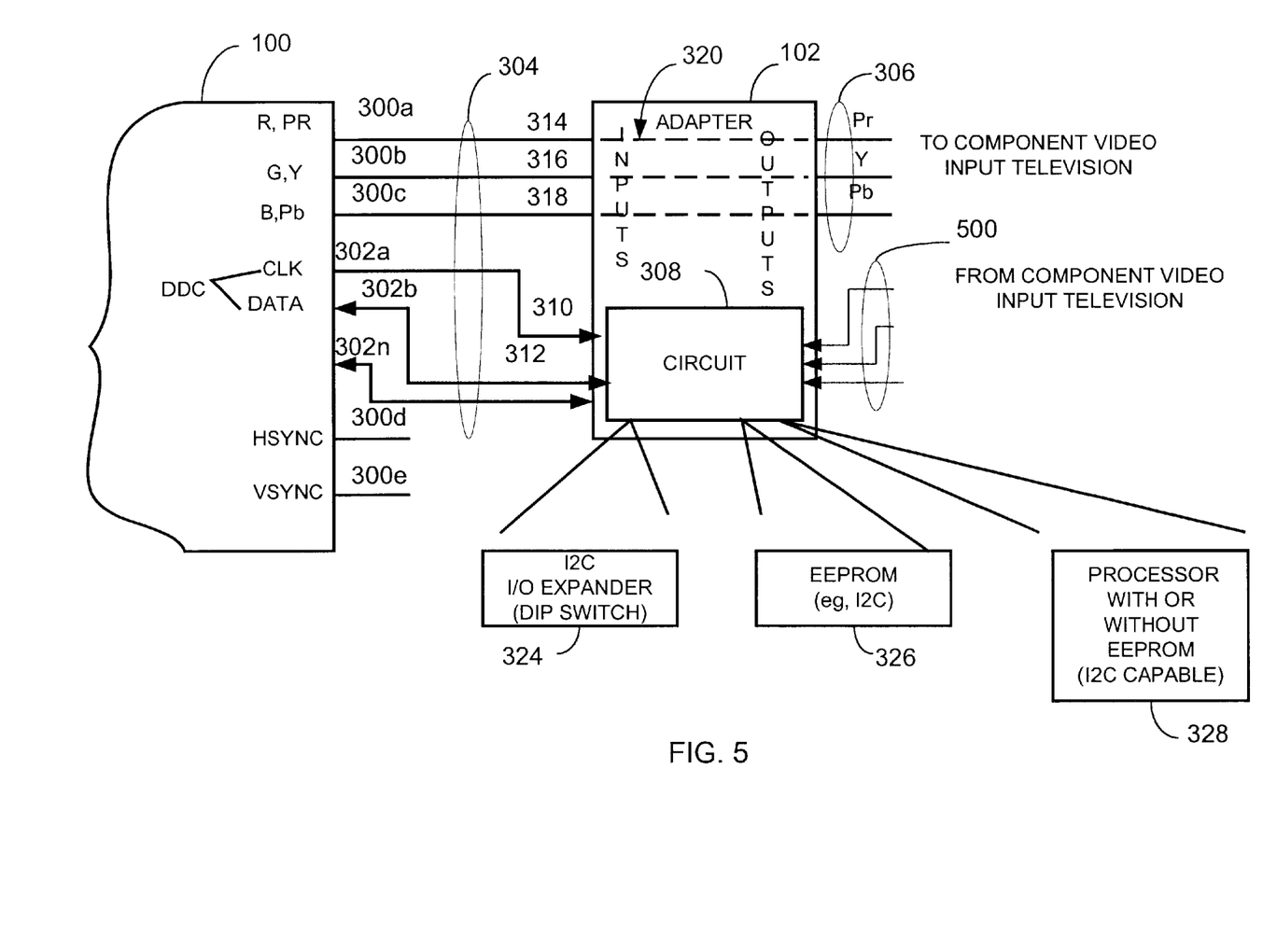
FIG. 5 is a diagram illustrating another example of an adapter in accordance with one embodiment of the invention.

FIG. 5 illustrates an adapter with input control pins 500 that receive monitor ID information as sent from the component video input television where such a television is capable of sending such information. In this embodiment, the circuit 308 translates the monitor ID information into DDC format or other format understood by the video BIOS or driver. This information is used to determine the appropriate timing color space etc as previously described.

Accordingly, the disclosed connector includes a circuit and, for example, DDC lines that are used to indicate that an SDTV or HDTV or other suitable component video input television is being connected to what may normally be a VGA-type video providing unit even though the SDTV or HDTV has no monitor ID system. Alternatively, a microcontroller may be placed in the adapter that may be used to identify the basic capabilities of the attached monitor such as if it is a 480I, 480P, 720P, 1080I, 1080P, 50/60 Hz, RGB/YPrPb, 16:9 or 4:3 aspect ratio, etc. type monitor. The microprocessor can do a full DDC communication back to the video providing unit identifying the modes that the SDTV or HDTV supports. Accordingly, a proper image appears on power up of a video providing unit when connected with a component video input television that does not include a monitor ID system. If desired, the adapter may be sold with an SDTV or HDTV, for example, and contain the required scan rate, video format information or other desired information. Alternatively, the adapter may be sold as a separate unit or with the video signal providing unit. Other advantages will be recognized by those of ordinary skill in the art.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An adapter operative to connect a component video input television and a video providing unit having a non-component video input television default display mode comprising:
   a plurality of video input pins;
   a plurality of control pins;
   a plurality of video output pins; and
   a circuit, operatively coupled to the plurality of control pins, and operative to identify to the video providing unit, through the use of the plurality of control pins, that the component video input television is not of a display type that the video providing unit expects, wherein the circuit includes a digital processing device operative to communicate with the component video input television to obtain display configuration data and to provide the display configuration data to the video providing unit.

2. The adapter of claim 1 wherein a plurality of video input pins are operatively connected to the plurality of video output pins to provide component video information between the video providing unit and the component video input television.

3. The adapter of claim 2 wherein the plurality of video input pins include at least three input pins such that the plurality of video input pins include three pins that are coupleable to receive component video signals from the video providing unit and the plurality of control pins include two pins that can be used to communicate with the video providing unit.

4. The adapter of claim 1 wherein circuit includes programmable memory that contains display configuration data associated with a display of the component video input television.

5. The adapter of claim 1 wherein the circuit includes a selectable switching array having a plurality of switches that are appropriately switched to a selectable position depending upon a type of component video input monitor being connected to the plurality of video output pins of the adapter.

6. An adapter operative to connect a component video input television and a video providing unit having a non-component video input television default display mode comprising:
   a plurality of video input pins;
   a plurality of control pins;
   a plurality of video output pins; and
   a circuit, operatively coupled to the plurality of control pins, and operative to identify to the video providing unit, through the use of the plurality of control pins, that the component video input television is not of a display type that the video providing unit expects,
   wherein the component video input television is one of a standard definition television and high definition television and wherein the circuit provides $I^2C$ protocol based information over the control pins to the video providing unit to facilitate display data channel communication.

7. An adapter operative to connect a component video input television and a video providing unit having a non-component video input television default display mode comprising:
   a plurality of video input pins;
   a plurality of control pins;
   a plurality of video output pins; and
   a circuit, operatively coupled to the plurality of control pins, and operative to identify to the video providing unit, through the use of the plurality of control pins, that the component video input television is not of a display type that the video providing unit expects,
   including a plurality of control input pins operatively coupled to the circuit to pass monitor ID information received from the component video input television and wherein the circuit translates the monitor ID information into a format understood by a video BIOS or driver.

8. A method for communicating video signals to a display device that does not include a display identification system comprising the steps of:
   receiving, by a multi-pin adapter operatively interposed between a video signal provider and the display device, a display identification request;
   providing, by the adapter, a response to the display identification request;
   providing a suitable format of video signals to the display device in response to the response provided by the adapter; and
   providing, by the adapter, display configuration data associated with a display of a component video input television.

9. A method for communicating video signals to a display device that does not include a display identification system comprising the steps of:
   receiving, by a multi-pin adapter operatively interposed between a video signal provider and the display device, a display identification request;

providing, by the adapter, a response to the display identification request;

providing a suitable format of video signals to the display device in response to the response provided by the adapter;

initiating, by the adapter, communication with the display device and providing a user interface via the display device to obtain display identification information; and providing, by the adapter, display configuration data associated with a display of a component video input television to provide the suitable format of video signals.

10. A method for communicating video signals to a display device that does not include a display identification system comprising the steps of:

receiving, by a multi-pin adapter operatively interposed between a video signal provider and the display device, a display identification request;

providing, by the adapter, a response to the display identification request; and providing a suitable format of video signals to the display device in response to the response provided by the adapter.

* * * * *